(12) United States Patent
Oh et al.

(10) Patent No.: US 6,698,054 B2
(45) Date of Patent: Mar. 2, 2004

(54) METHOD FOR FABRICATING HIGH-PURITY SILICA GLASS USING SOL-GEL PROCESSING

(75) Inventors: Jeong-Hyun Oh, Daegu-kwangyokshi (KR); Mi-Kyung Lee, Kyonggi-do (KR)

(73) Assignee: Samsung Electronics Co, LTD, Suwon (KR)

( * ) Notice: Subject to any disclaimer, the term of this patent is extended or adjusted under 35 U.S.C. 154(b) by 420 days.

(21) Appl. No.: 09/750,510

(22) Filed: Dec. 28, 2000

(65) Prior Publication Data
US 2001/0009102 A1 Jul. 26, 2001

(30) Foreign Application Priority Data
Dec. 31, 1999 (KR) .................... 1999-68274

(51) Int. Cl.[7] ............ C03B 37/06; C01B 33/14
(52) U.S. Cl. .............. 15/19.2; 516/85; 501/12
(58) Field of Search ............ 65/17.2, 395, 399, 65/440; 501/11, 12; 423/338; 516/85, 111

(56) References Cited

U.S. PATENT DOCUMENTS

| | | | | |
|---|---|---|---|---|
| 4,504,595 A | * | 3/1985 | Jacques et al. | 502/224 |
| 4,840,653 A | * | 6/1989 | Rabinovich | 65/395 |
| 5,240,488 A | | 8/1993 | Chandross et al. | 65/3.11 |
| 5,912,397 A | * | 6/1999 | Baik et al. | 65/17.2 |
| 5,919,280 A | * | 7/1999 | Oh et al. | 65/17.2 |
| 6,223,563 B1 | * | 5/2001 | Bahr et al. | 65/395 |
| 6,442,977 B1 | * | 9/2002 | Bhandarkar et al. | 65/395 |
| 6,519,976 B2 | * | 2/2003 | Oh | 65/395 |

* cited by examiner

Primary Examiner—Steven P. Griffin
Assistant Examiner—Carlos Lopez
(74) Attorney, Agent, or Firm—Cha & Reiter

(57) ABSTRACT

Disclosed is a method for fabricating high-purity silica glass using a sol-gel processing that includes the steps of: (a) mixing a deionized water with a fluorine compound and a dispersion agent to prepare an aqueous premix solution; (b) mixing the aqueous premix solution with a fumed silica; (c) mixing the resulting mixture to form a dispersed sol; (d) aging the sol at the ambient temperature to stabilize silica particles; and, (e) removing air voids from the sol and adding a gelation agent.

6 Claims, 1 Drawing Sheet

METHOD FOR FABRICATING HIGH-PURITY SILICA GLASS USING SOL-GEL PROCESSING

This application claims priority to an application entitled "METHOD FOR FABRICATING HIGH-PURITY SILICA GLASS USING SOL-GEL PROCESSING" filed with the Korean Industrial Property Office on Dec. 31, 1999 and there duly assigned Ser. No. 99-68274.

BACKGROUND OF THE INVENTION

1. Field of the Invention

The present invention relates generally to a method for fabricating silica glass, and in particular, to a method for fabricating high-purity silica glass using a sol-gel process.

2. Description of the Related Art

Silica glass, which is a raw material of high-purity glass articles, has been useful for optical devices, such as optical fiber and photomask for a semiconductor. Silica glass is generally manufactured using a natural quartz process, synthetic quartz process, or sol-gel process.

The sol-gel processing is a technique of securing high-purity silica glass through the provision of high purity materials as the starting materials. When the sol-gel process is used as a liquid phase process, high productivity can be achieved and the composition of the product can be controlled easily compared to other processes. Also, the sol-gel process is economical because almost all steps except sintering are carried out at a low temperature.

A fabrication method of silica glass using the sol-gel processing is disclosed in detail in U.S. Pat. No. 5,240,488 under the title, "Manufacture of vitreous silica product via a sol-gel process using a polymer additive."

In the fabrication of silica glass using the sol-gel processing, there are various factors including temperature, composition, pressure, acidity and solvency which have an adverse effect in the transition of sol to gel and the strength of the gel. To overcome the problem, an attempt has been made on a method for securing the flexibility and strength of the gel while preventing cracks during the drying process.

As disclosed in U.S. Pat. No. 5,240,488, the fabrication method of silica glass using the sol-gel processing involves dispersing the fumed silica in an alkaline region to form a sol, then adding the polymer and gelation agent to ultimately produce the final silica glass. This method helps to prevent some of the cracks in the gel during the drying step and reduces the residual carbon in the final product when an organic binder is added, thus allowing the production of a fairly large silica glass. However, there is still a high chance of cracking in the gel during the manufacturing process because the gel has low strength.

In other instances, the sol-gel processing involves the addition of the fluorine compound so as to reduce the refractivity and the heat expansion coefficient of silica as well as the viscosity of the silica glass at a high temperature. The fluorine compound is an acidic substance used as a gelation agent for a polymeric sol or a silica particulate sol, which are both dispersed in an acidic region with a low hydrogen ion content. However, the fluorine compound is not used as the gelation agent in the sol despersed in the alkaline region because the existing fluorine compound tends to lower the hydrogen icon content of the sol and causes unwanted rapid gelation.

SUMMARY OF THE INVENTION

It is, therefore, an object of the present invention to provide a method for fabricating high-purity silica glass using a sol-gel process in which a fluorine compound is added to provide bar-shaped silica glass with minimized cracks during the drying step and thus improves the plasticity.

It is another object of the present invention to provide a method for fabricating high-purity silica glass using a sol-gel process which allows the production of a particulate sol containing the fluorine compound even in the alkaline region so as to reinforce the wet gel, thereby minimizing the formation of cracks in the drying step.

Accordingly, the method for fabricating high-purity silica glass using a sol-gel processing includes the steps of: (a) mixing deionized water with a fluorine compound and a dispersion agent to prepare an aqueous premix solution; (b) mixing the aqueous premix solution with a famed silica; (c) mixing the resulting mixture to form a dispersed sol; (d) aging the dispersed sol at the ambient temperature to stabilize silica particles; and, (e) removing air voids from the sol and adding a gelation agent.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
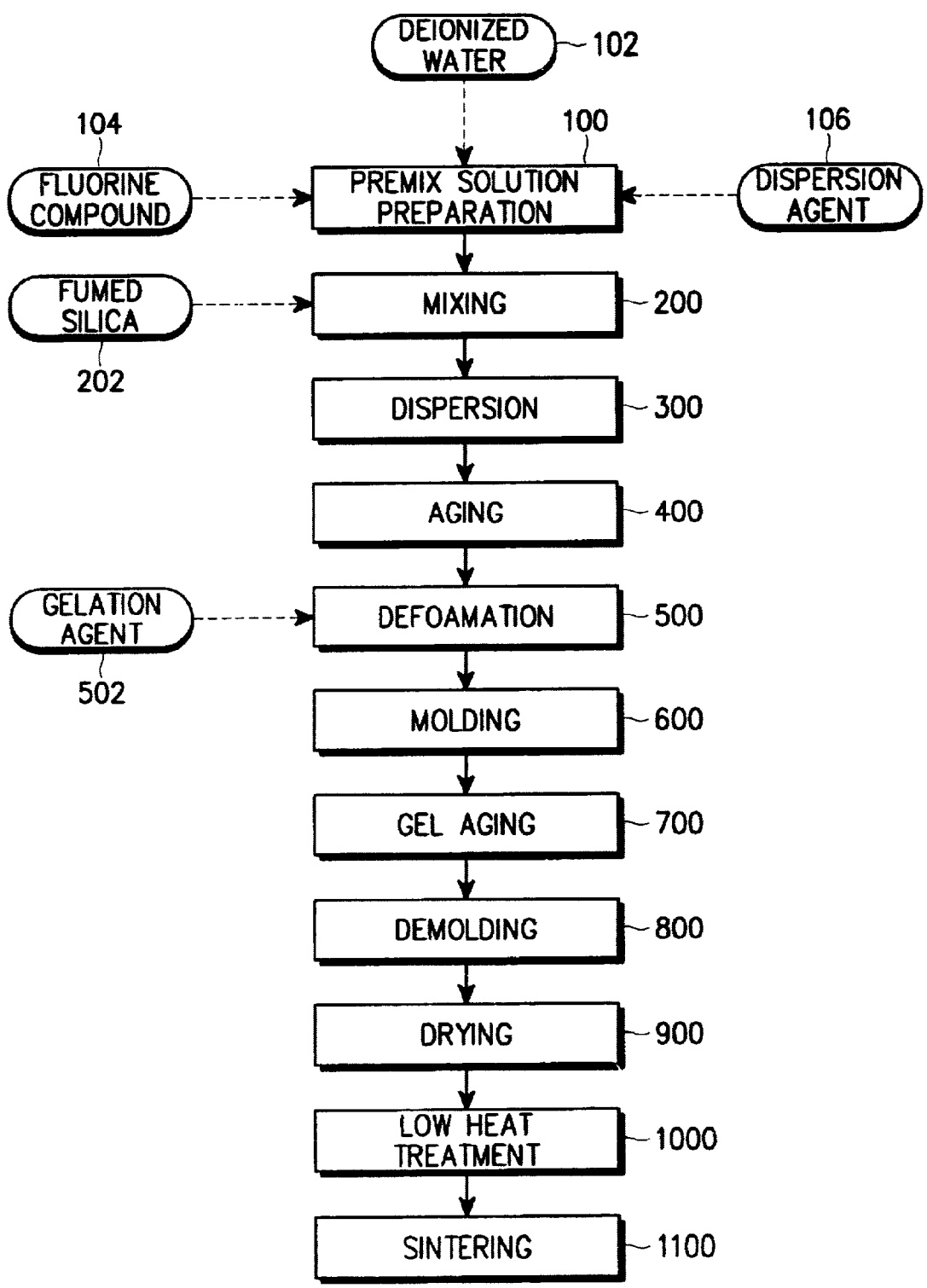
FIG. 1 is a flow chart showing the process for fabricating high-purity silica glass using a sol-gel process in accordance with the present invention.

FIG. 1 is a flow chart illustrating the process of fabricating high-purity silica glass using a sol-gel process in accordance with the present invention. As shown in FIG. 1, the fabrication method of high-purity silica glass using a sol-gel process comprises: aqueous premix solution fabrication step 100, mixing step 200, dispersion step 300, aging step 400, defoamation step 500, molding step 600, gel aging step 700, demolding step 800, drying step 900, low heat treatment step 1000, and sintering step 1100.

In the conventional method, a polymer is typically added as a binder to an aqueous premix solution of silica and deionized water. However, the present invention employs the fluorine compound to prepare the aqueous premix solution, mixes the aqueous premix solution with a famed silica and subjects the resultant mixture to dispersion under the alkaline condition, then aging to form a sol, which is subsequently mixed with a gelation agent to change from the sol to the gel.

The aqueous premix solution fabrication step 100 involves mixing deionized water 102 with the fluorine compound 104 and dispersion agent 106 to prepare an aqueous premix solution. This step prevents rapid gelation of the sol that may otherwise happen due to the direct addition of the fluorine compound 104. Examples of the fluorine compound include $NH_4F$, $(NH_4)SiF_6$, and HF. The dispersion agent 106 includes tetramethylammonium hydroxide or ammonium hydroxide that maintains the hydrogen ion content of the aqueous premix solution in the range of 10 to 13, with the enhanced dispersability of silica particles. The fluorine content of the silica glass can be readily controlled by regulating the amount of the fluorine compound 104 added in the aqueous premix solution fabrication step 100.

The mixing step 200 includes mixing the aqueous premix solution with the fumed silica 202. The amount of the fumed silica added is in the range of 40 to 60 wt. %.

The dispersion step 300 includes mixing the mixture obtained in the mixing step 200 to form a dispersed sol. This step can be carried out in a high shear mixer and followed by ultrasonic milling and centrifugal separation for the purpose of increasing the uniformity of the silica particles and removing impurities.

The aging step 400 includes aging the sol prepared in the dispersion step 300 at the ambient temperature for a predetermined time to stabilize the silica particles in the sol.

The defoamation step 500 involves removing the air voids contained in the aged sol and adding the gelation agent 502. Here, the gelation agent 502 controls the acidity of the sol and promotes the gelation of the sol, thus reducing the duration of the gelation process while increasing the strength of the wet gel. Examples of the gelation agent 502 includes methyl formate, methyl lactate and ethyl lactate, which are used alone or in combination.

The molding step 600 involves pouring the sol prepared in the defoamation step 500 into a mold with a defined shape, then subjecting it to polymerization reaction and gelation. The mold consists of a cylindrical shape and concentric rod to form a tubular casting, including an overjacketing tube or a substrate tube.

The gel aging step 700 involves aging the molded article from the molding step 600 so as to increase the strength of the wet gel.

The demolding step 800 separates the wet gel from the mold. In some cases, this step 800 can be carried out using the water pressure in a water bath in order to prevent damage to the wet gel.

The drying step 900 involves drying the wet gel separated from the mold in the demolding step 800 in a humidity chamber at a constant temperature to form a dry gel.

The low heat treatment step 1000 involves heat-treating the dry gel under the atmosphere of a gas, such as chlorine, hydrogen or oxygen, to decompose the residual water and organic substances in the dry gel and to remove metallic impurities and hydroxyl groups (OH). This step removes the impurities from the dry gel as described above and is sometimes referred to as "purification step".

The sintering step 1100 sinters the dry gel into vitreous gel at high temperature and produces the final high-purity silica glass. The sintering 1100 is carried out by heating the dry gel up to 1400° C. with a furnace moving up and down in the sintering furnace under the helium (He) atmosphere, then produces the final high-purity bar-shaped silica glass. The silica glass as obtained in the present invention contains the fluorine compound that lowers the viscosity of the silica glass to reduce the time and cost required in the high heat treatment combining step, such as overjacketing.

EXAMPLE 1

2.825 g of deionized water was mixed with 375 cc of an aqueous solution containing 25 wt. % of tetramethylammonium hydroxide and $NH_4F$. 3000 g of a fumed silica (Aerosil-OX50, Degussa) was added to the mixture, which was then dispersed with a high shear mixer to form a sol.

Subsequently, the sol separated from the mixer was aged at 18° C. for 10 hours. 5000 g of the aged sol was weighted and the air voids were removed using a vacuum pump. 95 cc of ethyl lactate was then added to the defoamed sol.

After a second defoamation, the sol was poured into a mold to provide a molded wet gel. This wet gel was separated from the mold and dried at a constant temperature and humidity chamber at 30° C. and at a 75% relative humidity to obtain a dry gel. The dry gel was then subjected to the heat treatment in the temperature range of 300 to 600° C. at the heating rate of 50° C./hr for 3 hours in order to eliminate residual water and additives from the dry gel.

The dry gel after the heat treatment was placed in the sintering furnace and kept at a raised temperature of 900° C. at the heating rate of 100° C./hr for 2 hours. As such, the chlorine gas was supplied into the sintering furnace to remove the residual hydroxyl group (OH) from the dry gel. Subsequently, the sintering furnace was heated to 1400° C. at the heating rate of 100° C./hr under the helium (He) atmosphere for one hour to obtain high-purity silica glass.

EXAMPLE 2

30 g of glycerin was added as a plasticizer to the sol in step 200 of Example 1. The subsequent procedures were performed in the same manner as described in Example 1.

EXAMPLE 3

2.825 g of deionized water was mixed with 375 cc of an aqueous solution containing 25 wt. % of tetramethylammonium hydroxide and $(NH_4)SiF_6$. 3000 g of a fumed silica (Aerosil-OX50, Degussa) was added to the mixture, which was then dispersed with a high shear mixer to form a sol.

The sol separated from the mixer was aged at 18° C. for 10 hours. 5000 g of the aged sol was weighted and the air voids were removed using a vacuum pump. 95 cc of ethyl lactate was then added to the defoamed sol. The subsequent procedures were performed in the same manner as described in Example 1.

EXAMPLE 4

30 g of glycerin was added to the sol in step 200 of Example 3. The subsequent procedures were performed in the same manner as described in Example 3.

The method for fabricating high-purity silica glass using a sol-gel processing in accordance with the embodiment of the present invention enables the production of high-+purity silica glass from a low-purity fumed silica and secures the high strength of the wet gel, thus allowing the production of large-sized silica glass.

Furthermore, the present invention method involves the addition of the fluorine compound to the aqueous premix solution instead of adding the fluorine compound directly to the sol, so that the sol can secure dispersability with the prevention of rapid gelation.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. A method for fabricating high-purity silica glass using a sol-gel processing, comprising the steps of:
   (a) mixing deionized water with a fluorine compound and a dispersion agent to prepare an aqueous premix solution;
   (b) mixing the aqueous premix solution with a fumed silica to form a resulting mixture;
   (c) mixing the resulting mixture to form a dispersed sol;
   (d) aging the dispersed sol at the ambient temperature to stabilize silica particles; and,
   (e) removing air voids from the sol and adding a gelation agent.

2. The method of claim 1, wherein the fluorine compound added in the step (a) of the aqueous premix solution is $NH_4F$.

3. The method of claim 1, wherein the fluorine compound added in the step (a) of the aqueous premix solution is $(NH_4)SiF_6$.

4. The method of claim 1, wherein the fluorine compound added in the step (a) of the aqueous premix solution is HF.

5. The method of claim 1, wherein the dispersion agent used in the step (b) is tetramethylammonium hydroxide.

6. The method of claim 1, wherein the gelation agent used in the step (e) is any one selected from the group consisting of methyl formate, methyl, and ethyl lactate.

* * * * *